Nov. 19, 1968   H. W. SATTER   3,412,258
ELECTRIC GOVERNOR SYSTEMS
Filed March 3, 1966   2 Sheets-Sheet 1

INVENTOR.
HARVEY WILLIAM SATTER
BY Krazinski & Nolan
ATTORNEYS

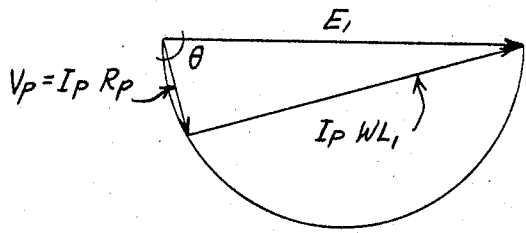
Fig. 4.
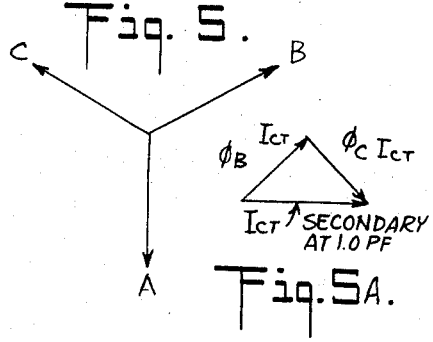
Fig. 5.
Fig. 5A.
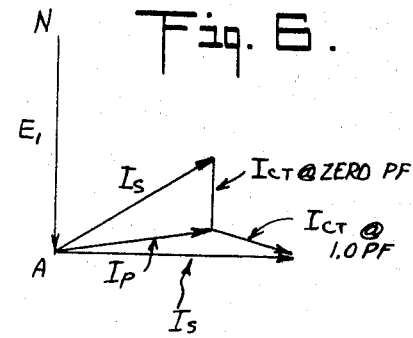
Fig. 6.
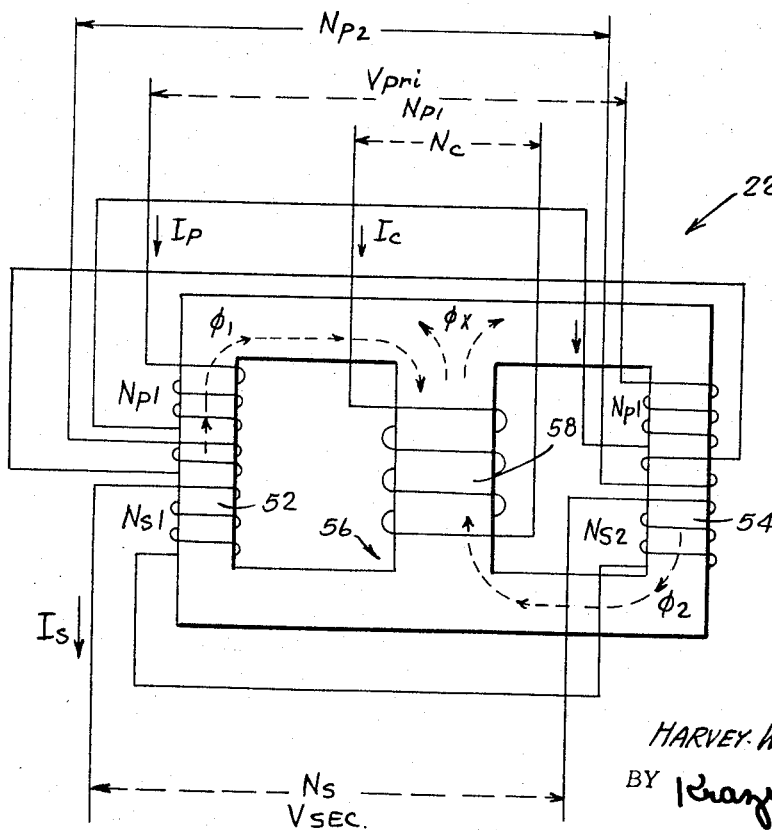
Fig. 7.
INVENTOR.
HARVEY WILLIAM SATTER
BY Krazinski & Nolan
ATTORNEYS

United States Patent Office 3,412,258
Patented Nov. 19, 1968

3,412,258
ELECTRIC GOVERNOR SYSTEMS
Harvey William Satter, Stamford, Conn., assignor to Condec Corporation, Stamford, Conn., a corporation of New York
Filed Mar. 3, 1966, Ser. No. 531,493
8 Claims. (Cl. 290—40)

This invention relates to an electric governor system, particularly to a governor for an engine-generator set, and has for its principal object to control the speed of the engine so as to maintain a constant frequency output of the generator regardless of the condition of load at the generator output terminals.

Another object of the invention is to provide a power sensing network for converting generator power to fuel actuator excitation.

Still another object of the invention is to provide a governor system in which excitation to the fuel actuator is directly proportional to the "real load" (in kilowatts) output of the generator.

Yet another object of the invention is to provide a governor system that is self-compensated.

Other and further objects will be obvious upon an understanding of the illustrative embodiment about to be described, or will be indicated in the appended claims, and various advantages not referred to herein will occur to one skilled in the art upon employment of the invention in practice.

A more complete understanding of the invention will be obtained from the detailed description which follows and by reference to the appended drawings wherein:

FIGS. 4, 5, 5A and 6 are vector diagrams illustrating the relationship between the input voltage and the primary current of FIGS. 2 and 3; and FIG. 7 is a schematic diagram of a typical saturable transformer.

Figure 1:
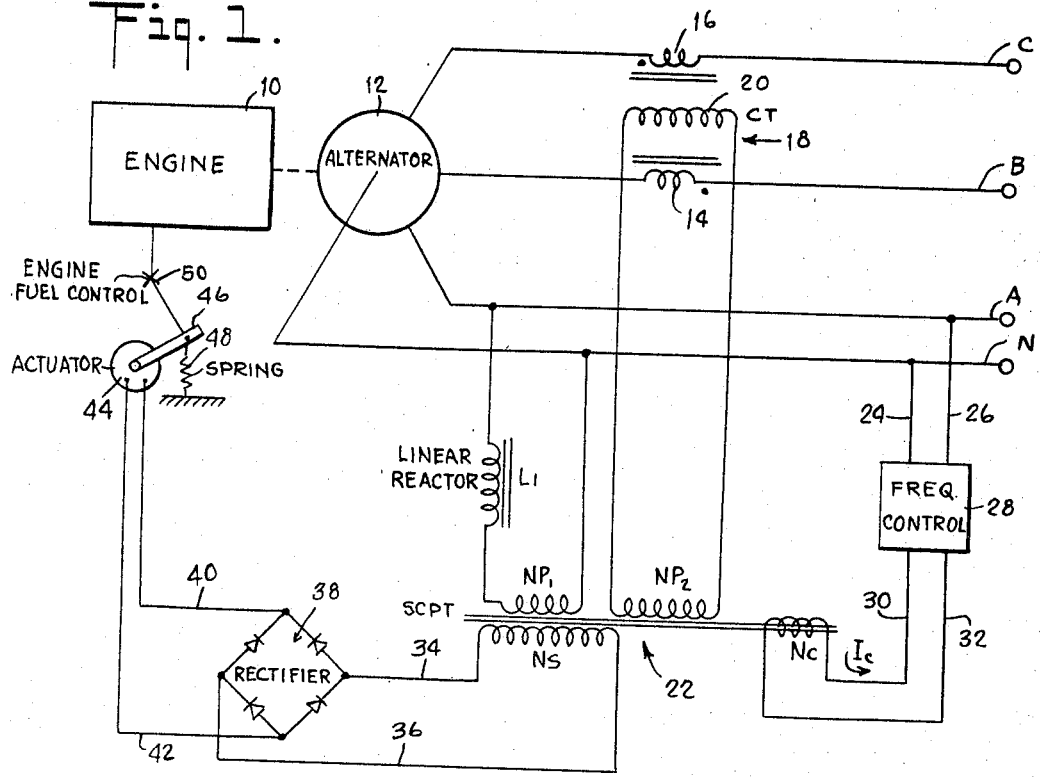
FIG. 1 is a schematic diagram of a three phase engine-alternator system showing one embodiment of the invention.

Referring now to the drawings, and particularly to FIG. 1, there is shown diagrammatically a three phase alternating current power system comprising an engine 10 of any suitable type, gasoline or diesel driven, for driving a three phase alternator 12 having four output leads, phases A, B and C and a neutral lead N. Serially disposed in phase leads B and C are primary windings 14 and 16, respectively, of a current transformer 18, the secondary winding 20 of which is connected to a primary winding NP2 of a saturable transformer 22. Bridged across phase lead A and neutral lead N is shown a linear reactor $L_1$ in series with a primary winding $NP_1$ of the saturable transformer 22. Also bridged across phase lead A and neutral lead N by conductors 24 and 26 is one side of a frequency control unit 28, while the other side of the frequency control unit 28 is connected by conductors 30 and 32 to a control winding $Nc$ of the saturable transformer 22. It is to be noted that the phase relationship shown is typical. However, it is important that the particular phase selected for the linear reactor $L_1$ be other than the two phases to which the current transformer windings 14 and 16 are connected. The secondary winding $Ns$ of the saturable transformer 22 is connected by conductors 34 and 36 to a full wave bridge rectifier 38, the other side of which is connected by conductors 40 and 42 to an electric actuator 44, which may be of several forms depending upon whether the engine 10 to be controlled is diesel oil or gasoline driven.

For a diesel engine the actuator 44 included a DC torque motor (not shown) connected through a linkage system directly to the fuel control system, termed a fuel injection rack, which determines the quantity of fuel fed to each cylinder. For the diesel engine using a fuel injection pump, the actuator 44 was an inherent part of the pump assembly and was in the form of a solenoid valve.

In the case of a gasoline engine, the actuator 44 included a carburetor butterfly valve, which controls the air flow through the venturi and which, in turn, determines the quantity of fuel fed to the cylinder of the engine.

However, whether for a diesel oil or gasoline driven engine 10, the actuator 44, as shown in FIG. 1, is arranged to have its torque arm 46 urged against a spring 48, so that excitation to the actuator 44 is of unidirectional polarity. In the majority of applications of the invention, an increase in excitation of the actuator 44 likewise increased fuel flow through a fuel control unit 50 to the engine 10. This condition obtains where tension of the spring 48 holds the actuator torque arm 46 in an "OFF" fuel position and electrical energy imparted to the actuator 44 drives the arm 46 into an "ON" fuel position. Of course, the opposite mode can be used.

Figure 2:
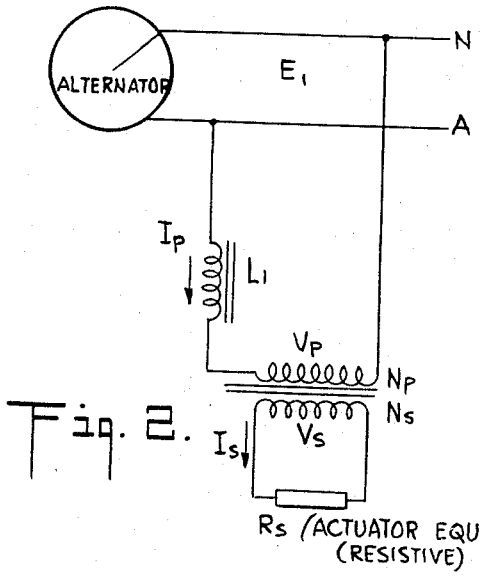
FIG. 2 is a schematic diagram showing a portion of FIG. 1, wherein the actuator and rectifier of FIG. 1 are indicated in the secondary of the saturable transformer as a resistive load.
Figure 3:
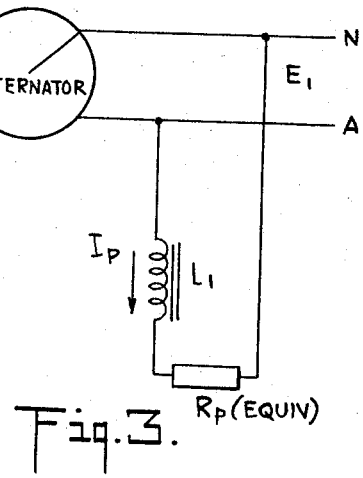
FIG. 3 is a schematic diagram showing a portion of FIG. 2, wherein the saturable transformer and resistive load of FIG. 2 are indicated as an equivalent resistance.

The basis of system operation is that excitation to the actuator 44 is directly proportional to "real load" (kilowatts) output of the alternator 12. The system, therefore, is one of self compensation, very much the same as a compound wound DC generator may be said to be self-compensated. Considering now operation of FIG. 1, initially in starting the engine 10 the conventional starting motor (not shown) also energizes the torque motor of actuator 44 to place the throttle (not shown) temporarily in full throttle position. The engine then runs at idle speed with the spring 48 engaging an idle stop. With the engine 10 and alternator 12 delivering three phase power, the phase A line to neutral voltage of the alternator 12 supplies a regulated voltage to the linear reactor $L_1$ in series with the voltage primary winding $NP_1$ of the saturable transformer 22. The secondary winding $Ns$ of the saturable transformer is connected through the rectifier 38 to the actuator 44, which is represented as a DC torque motor. The current in the primary circuit, as determined by the linear reactor $L_1$, is that current necessary in the torque motor to position the engine fuel control 50 so as to provide rated frequency at no load on the alternator 12 and at rated output voltage of the alternator. Assuming such a no load excitation circuit and further assuming that the torque motor 44 and rectifier 38 look like a resistive load to the saturable transformer 22, the primary winding $NP_1$ can be replaced with an equivalent resistance, as shown in FIGS. 2 and 3.

Accordingly, $$Vs = IsRs \tag{1}$$

$$Vp = Vs\frac{Np}{Ns} = Is\frac{Np}{Ns}Rs = Ip\left(\frac{Np}{Ns}\right)^2 Rs \tag{2}$$

Therefore, $$Vp = IpRp \text{ where } Rp = \left(\frac{Np}{Ns}\right)^2 Rs \tag{3}$$

$$E_1 = IpRp + jwL_1Ip \tag{4}$$

Equation 4 defines the relationship between the voltage $E_1$ and the primary current $Ip$. The phase relationship between these two is shown in FIG. 4 and is evident from the following trigonometric equations:

$$\tan \theta = \frac{IpwL_1}{IpRp} = \frac{wL_1}{Rp} \quad (5)$$

$$\cos \theta = \frac{IpRp}{E_1} = \frac{Vp}{E_1} \quad (6)$$

From FIG. 4 it may also be observed that by reducing the vector $IpRp$ to zero does not materially affect the magnitude of the vector $IpwL_1$. Since the linear reactor $L_1$ cannot change, then $Ip$ must remain essentially a constant current source, assuming voltage $E_1$ remains constant, regardless of the value of the equivalent resistance $Rp$.

It is to be noted in FIGS. 1, 5, 5A and 6 that the two primary windings 14 and 16 of the current transformer 18 in phases B and C of the alternator 12 are of such a winding polarity that the secondary current $Ict$ delivered by secondary winding 20, while the alternator is supplying unity power factor load, is in quadrature with the voltage from phase A to the neutral lead N (see FIG. 6). This secondary current $Ict$ flows through the primary winding NP2 of the saturable transformer 22. Also, as shown in FIG. 6, the two currents $Ip$ and $Ict$ flowing through the two primary windings NP1 and NP2, respectively, of the saturable transformer 22 add vectorially to produce a secondary current $Is$, which essentially adds arithmetically at unity power factor load currents and in quadrature at zero power factor. The vector addition, when in quadrature, adds very little to the total. Thus the circuit may be said to produce an output current $Is$ which increases only proportionally to the magnitude of the alternator load current, which is at unity power factor or "real load."

Accordingly, this output current $Is$, termed load sensitivity, is fed to the actuator 44, via the rectifier 38, in such manner as to increase the actuator torque and, in turn, fuel through the fuel control mechanism 50 to the engine 10, which load sensitivity is directly proportional to the watt loading output of the alternator 12. By proper design of the components and ratios, the vectorial addition can be matched very closely to the torque requirements of the actuator 44 so as to maintain fuel at the level required for the rated frequency.

Because such a system will rarely be perfect and since there is no provision for actuator excitation changes caused during warm-up of the engine 10 or by effects of environmental changes, trimming control is necessary to maintain a high standard of frequency regulation accuracy. This trimming control is provided by the frequency control circuit 28 which supplies a direct current $Ic$ nonlinearly proportional to alternator frequency. This direct current $Ic$ acts on the control winding $Nc$ of the saturable transformer 22 in such a way as to change its output voltage and thereby excitation of the actuator 44. The effect of direct current in the control winding $Nc$ is one of saturating the core material to decouple the secondary winding $Ns$ of the saturable transformer 22 from the current and voltage primary windings.

In FIG. 7 is shown diagrammatically a typical saturable transformer 22. The outer legs 52 and 54 of the core 56 are each wound with the primary windings NP1 and NP2 and the secondary winding $Ns$ ($Ns_1$ and $Ns_2$); and the center leg 58 is wound with the control winding $Nc$. The ends of the primary and secondary windings on each outer leg of the core 56 are joined together in order to prevent any net flux change in the center leg 58, so that no fundamental frequency voltage is induced in the control winding $Nc$. When a DC current is allowed to flow through this control winding $Nc$, however, it creates a flux, which when added to the AC flux (shown in dotted lines) produced by the primary circuits, forces the core 56 into a state in which no further flux change can occur, thus preventing a portion of the input volt-seconds from appearing in the secondary winding $Ns$. Since generally only a small amount of change is necessary to achieve a high degree of regulation accuracy, only minor control current changes are thus required. The function of the frequency control unit 28 is therefore to measure frequency delivered by the alternator 12 and to convert this to a DC current having sufficient gain and power to exert control over the saturable transformer 22 and thus maintain system performance within the required specification limits. The actual circuitry of the control unit 28 is conventional, so that a detailed description thereof is not deemed necessary.

The major advantages of the invention are: (a) inherently rapid transient response to load changes because of the instantaneous effect of the current transformer 18 action. It should be noted that the change of excitation to the actuator 44 is independent of frequency and thus does not depend upon a frequency deviation prior to a corrective action; and (b) the inherent self regulating action requires the frequency control unit 28 to perform only a minor readjustment, so that the control unit 28 need not be a particularly high performance device nor have particularly fast time constants. Consequently, in systems that can withstand wide frequency tolerances it is possible to eliminate the frequency control unit 28.

The invention described hereinbefore was applied to an overall system consisting of a 60 cycle per second, precise regulated, engine-generator set. The prime mover was a gasoline engine and the governor of this invention acted to control speed through the engine carburetor. Subsequent developments, using the same inventive concept, were successfully applied to 60 and 400 cycle per second engine-generator sets where the prime movers were diesel engines. Control in the latter was achieved through control of the fuel injection rack in the case of GM and Lister engines, and through control of the fuel solenoid in the fuel injection pump (Roosa Master) in the case of the Cerlist engine.

From the foregoing description it will be seen that the present invention provides an improved electric governor system for controlling speed of a three phase motor-generator set through (a) an electric actuator which converts electrical energy into mechanical power necessary to change the fuel input to the prime mover; (b) an electric power network which senses the power output from the generator and changes it to the level and form necessary to directly energize the said electric actuator; and (c) a frequency sensing network and amplifier whose output acts on the said power network to modify the power into the said electric actuator in order to maintain a precise regulated frequency.

As various changes may be made in the form, construction, and arrangement of the parts herein, without departing from the spirit and scope of the invention and without sacrificing any of its advantages, it is to be understood that all matters are to be interpreted as illustrative and not in any limiting sense. For example, by shifting the phase angle of the current primary of the saturable transformer 22 the invention can be readily applied to single phase systems.

What is claimed is:

1. An electric governor for controlling speed of an engine so as to maintain a constant output frequency of an alternating current generator coupled to said engine comprising, in combination, electromagnetic means connected to output leads of said generator for withdrawing a portion of alternating current energy therefrom, a rectifier for converting said alternating current energy to direct current energy, means for converting said direct current energy to mechanical energy, and mechanical means responsive to said converting means for controlling fuel input to said engine, whereby the speed of said engine is accordingly varied, said electromagnetic means including a saturable transformer having a pair of primary windings and a secondary winding, a linear reactor interposed between said generator output leads and one of said primary windings, and a current transformer interposed between said generator output leads and the other of said primary windings, said secondary winding being connected to said rectifier.

2. An electric governor in accordance with claim 1, wherein said converting means include an actuator connected to said rectifier and responsive to direct currents from said rectifier, a fuel system for said engine, and mechanical linkage means interposed between said actuator and said fuel system responsive to said actuator for controlling fuel input to said engine.

3. An electric governor in accordance with claim 2, wherein said actuator includes a direct current torque motor interposed between said rectifier and said linkage means.

4. An electric governor in accordance with claim 3, wherein said linkage means includes a torque arm carried by said torque motor and resilient means for biasing said torque arm, so that excitation from said rectifier to said torque motor is of unidirectional polarity.

5. An electric governor in accordance with claim 3, wherein said linkage means includes a torque arm carried by said actuator and resilient means for biasing said torque arm, so that excitation from said rectifier to said actuator is of unidirectional polarity, whereby increased direct current flow from said rectifier correspondingly increases fuel flow to said engine.

6. An electric governor in accordance with claim 1, and frequency control means connected at its input to said generator output leads and a control winding on said saturable transformer connected to said frequency control means at its output for modifying the excitation produced by said primary and secondary windings on said actuator.

7. An electric governor in accordance with claim 1, wherein said generator is constituted by a three phase alternator having three phase output leads and a neutral output lead, said linear reactor is connected in series with said one of said primary windings of said saturable transformer and one of said phase leads and said neutral lead, and said current transformer includes a pair of primary windings serially connected respectively in the two other of said phase output leads and a secondary winding serially connected with the other of said saturable transformer primary windings.

8. An electric governor in accordance with claim 7, and frequency control means having a pair of leads at its input side connected to said one of said phase leads and said neutral lead, a control winding on said saturable transformer, and a pair of output leads of said frequency control means serially connected with said control winding, said output leads of said frequency control means carrying direct current to said control winding so as to saturate core material of said saturable transformer and thereby decouple said secondary winding of said saturable transformer from said primary windings of said saturable transformer.

References Cited

UNITED STATES PATENTS 3,287,565  11/1966  Lewis _____ 290—40

ORIS L. RADER, *Primary Examiner.*

W. E. DUNCANSON, *Assistant Examiner.*